United States Patent
Guldalian (10) Patent No.: US 10,323,974 B2
(45) Date of Patent: *Jun. 18, 2019

(54) OPTICAL SENSOR FOR A CONVENTIONAL TANK GAUGE

(71) Applicant: Eric Guldalian, West Trenton, NJ (US)

(72) Inventor: Eric Guldalian, West Trenton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/063,449

(22) Filed: Mar. 7, 2016

(65) Prior Publication Data

US 2017/0023395 A1    Jan. 26, 2017

Related U.S. Application Data

(62) Division of application No. 14/804,677, filed on Jul. 21, 2015, now Pat. No. 9,279,711.

(51) Int. Cl.
*G01F 23/292*    (2006.01)

(52) U.S. Cl.
CPC ........ *G01F 23/292* (2013.01); *G01F 23/2927* (2013.01)

(58) Field of Classification Search
CPC .................................................. G01F 23/2927
See application file for complete search history.

(56) References Cited

U.S. PATENT DOCUMENTS

| | | | | |
|---|---|---|---|---|
| 4,015,121 A | * | 3/1977 | Gagnon ................. | G01N 31/00 250/221 |
| 6,377,348 B1 | * | 4/2002 | Schneider ............ | G01N 21/534 250/573 |
| 8,436,292 B2 | * | 5/2013 | Takahashi ............. | F16C 19/386 250/227.25 |

* cited by examiner

*Primary Examiner* — Tony Ko (74) *Attorney, Agent, or Firm* — Muskin and Farmer LLC (57) ABSTRACT

An optical sensor for a conventional tank gauge designed to allow a user to remotely check the liquid level of a tank without the need for a visual inspection. Using an emitter circuit board with a plurality of photoemitters and a detector circuit board with a plurality of photodetectors, the optical sensor can fit over a conventional tank gauge without disturbing the gauge. The circuit boards can be attached to an optical sensor frame, which can be adjusted on the conventional tank gauge by a height adjustment screw and a series of set screws. Alternatively, one or more sliders can be used to maintain proper alignment. Analog data generated from the photodetectors can be digitized using a microcontroller and can be made available for viewing on a stationary or mobile device via an integrated network connection.

20 Claims, 7 Drawing Sheets

OPTICAL SENSOR FOR A CONVENTIONAL TANK GAUGE

FIELD OF THE INVENTION

The present device relates to an optical sensor that can be used to read the levels of liquid measured by a conventional tank gauge. U.S. application Ser. No. 14/804,677 is incorporated by reference in its entirety.

BACKGROUND

Many conventional gauges require direct visual reading to determine the current level of fluid inside a tank, such as those used to store home heating oil. This task may or may not be convenient to conduct on a routine basis depending on the tank location. Furthermore, ongoing manual readings of a tank gauge are necessary to detect when the contents reach a critical level.

One method to overcome this problem involves the removal of an existing conventional gauge and installation of an electronic gauge that analyzes sound waves prior to wirelessly transmitting notification signals to a receiver located within close proximity. Should such an electronic gauge fail during use the owner/operator has no secondary method of reading the tank level until the defective gauge is replaced with a new one or a conventional gauge is reinstalled. Secondly, this design requires the owner/operator to properly install the electronic replacement gauge onto the tank so the liquid contents do not evaporate through an improper seal.

In addition to using sound waves to remotely monitor the level of a tank, a different method integrates reed switches that turn on and off when a magnetic field is present. Such a design requires the temporary removal of the measurement vial of an existing conventional gauge; installation of a magnet holder on top of the indicator; placement of a magnet on the holder; and re-attachment of the measurement vial. Once the magnet has been installed a sensor consisting of switches and other electronic components is strapped to the measurement vial for the purpose of turning designated circuits on and off. The state of each circuit is transmitted via wire cable to a second device for interpretation and level indication. Similar to the sound wave method, this design requires the owner/operator to properly install the required magnet on top of the gauge indicator and reattach the measurement vial onto the tank so the liquid contents do not evaporate through an improper seal. Furthermore, this system does not allow the owner/operator to monitor the status remotely from a location beyond the linear distance of cable installed between the transmitter and receiver.

What is needed is an optical sensor that can be fitted over a conventional tank gauge in order to provide remote access to the measurements generated by the conventional gauge.

SUMMARY OF THE INVENTION

It is an aspect of the disclosure to provide an optical sensor that can be fitted over a conventional tank gauge in order to provide remote access to the measurements generated by the conventional gauge. These together with other aspects and advantages, which will be subsequently apparent, reside in the details of construction and operation as more fully hereinafter described and claimed, reference being had to the accompanying drawings forming a part hereof, wherein life numerals refer to like parts throughout.

A BRIEF DESCRIPTION OF THE DRAWINGS

Further features and advantages of the present device, as well as the structure and operation of various embodiments of the present device, will become apparent and more readily appreciated from the following description of the preferred embodiments, taken in conjunction with the accompanying drawings of which.

DETAILED DESCRIPTION

The present device is a different type of optical sensor that allows an existing conventional tank gauge to remain in place without disturbance and determines the level of a gauge indicator by monitoring photon beams that travel horizontally through a glass (or another translucent material, such as plastic) vial. More specifically, level detection is achieved by checking the state of a photon beam that travels from a photoemitter through a measurement vial to a corresponding photodetector, such as but not limited to a phototransistor, photodiode, etc., on the opposite side. If the photon beam is detected by a photodetector it means no obstruction is present, which is due to the indicator and/or stem resting below a given line of sight; therefore, the corresponding LED is dimmed or turned off. If the photon beam is not detected by a photodetector it means an obstruction is present, which is due to the indicator and/or stem resting on or above the line of sight; therefore, the corresponding LED is illuminated. Using an array of photoemitters, photodetectors and LEDs, the proposed invention is capable of monitoring one or more levels between full and empty. To prevent a photodetector from detecting a photon beam from a photoemitter other than its designated mate, the sides or surface of each emitter and photodetector must be shrouded or masked with an opaque material or compound to form a narrow aperture for the optical line of sight.

The physical framework of the invention includes a lower mounting ring that forms a base. Rising up from the base are: two opposing printed circuit boards (PCB) that may or may not be enclosed or covered; two or more vertical support rods for structural integrity and vertical alignment against a measurement vial; a cap with a countersunk section on the underside to form an upper chamber that receives the top of a measurement vial; and a screw threaded through the cap that can be turned to adjust the vertical height. Also, two or more set screws are provided in both the base and cap to press against the measurement vial once the invention's final position has been determined.

Once the primary embodiment has been supplied power the state of each photodetector will serve two main functions: 1) change the state of each corresponding LED indicator on the same circuit to provide an immediate on-site visual check that the device is working correctly; and 2) increase or decrease the voltage output within a range on the corresponding circuit that traces back to a microcontroller for analog to digital conversion. In addition to the arrays of photoemitters, photodetectors and LEDs used for this embodiment, additional components are attached to the PCBs, such as but not limited to resistors, headers, connectors and wire/cable. The cable connected to the sensor provides wires for the appropriate direct current (DC) supply voltage, ground, and monitoring the output voltage from each photodetector. At the opposite end of the cable a connection is made to a second device that houses supporting electronic hardware and software to capture the sensor data; and can emit an audible sound when a critical level is reached on the gauge or for some other notification purpose. In addition, this second device can function as an embedded server on a local network or a web client to routinely send the latest sensor data, along with unique identifiers, through the Internet to a remote server. The network connection may be made using wireless or wired technology, such as Bluetooth, WiFi, or Ethernet. Once the data is received by the embedded or remote server it can be analyzed and stored in one or more different types of memory and/or formats, such as, but not limited to, a database. If the server determines data from a sensor meets certain criteria an automated message will be communicated to a user as a text message sent to a phone and/or an email message. The server will also host a web site to provide each unique user with access to various services, such as but not limited to: 1) displaying graphics and text that represent the current status of the sensor; 2) turn automated messaging on/off; and 3) change the interval between client-server communications. Access to the server can be accomplished using nothing more than a web browser on numerous types of devices (e.g. computer, tablet, smartphone, etc.) with local network and/or Internet access. Alternatively, access to the server can be accomplished using an application developed for various operating systems.

In one alternative embodiment of the invention a separate microcontroller is integrated directly into the sensor to handle signal processing from each detector prior to transferring compiled data to the supporting hardware that functions predominately as an embedded server or web client. This compartmentalization approach allows a single embedded server or web client design to interface with many variations of the proposed invention without requiring significant changes.

Overall, the key electronic components found in the primary embodiment include, but are not limited to, arrays of photoemitters and phototransistors (photodetectors or detectors); LEDs for status indication; resistors with varying values; headers; connectors; wire/cable; one or more microcontrollers; an integrated circuit for network connection using wired and/or wireless technology; antenna; crystals; power supply jack; voltage regulator; capacitors; transistors; diodes; buttons; slide switches; and covers or housings to enclose the various PCBs.

Figure 1:
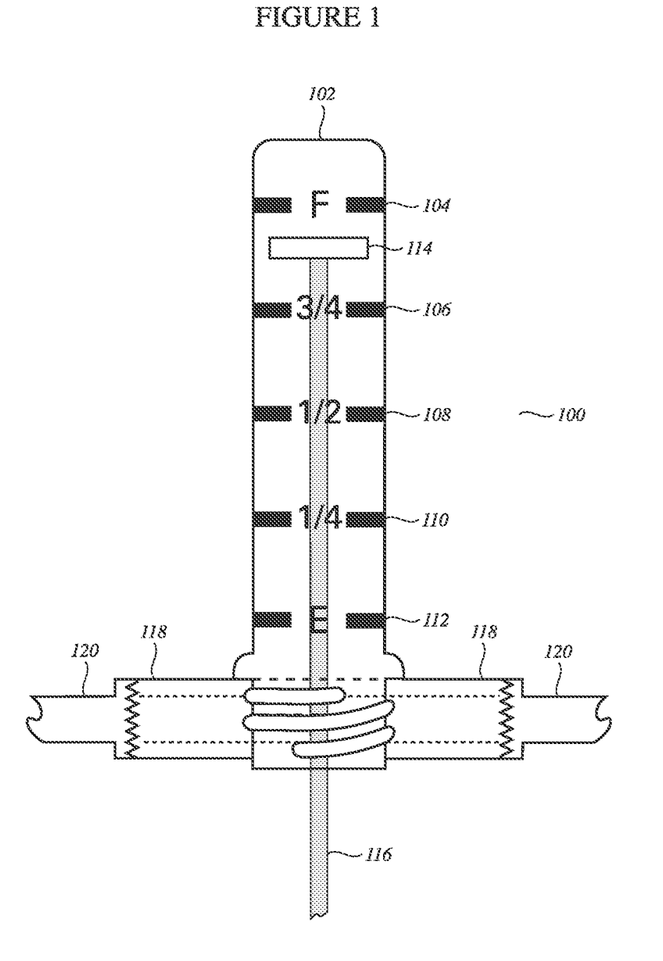
FIG. 1 is a cross section view of a conventional tank gauge without an optical sensor, according to an embodiment.

FIG. 1 is a cross section view of a conventional tank gauge 100 without an optical sensor, according to an embodiment. A conventional tank gauge 100 can be mounted on top of a liquid-filled tank (not shown). The conventional tank gauge can have a measurement vial 102 having measurement markings: an empty marking 112, a ¼ full marking 110, a ½ full marking 108, a ¾ full marking 106, and a full level marking 104 either drawn or etched on the measurement vial material, which can be glass or plastic. Inside the measurement vial 102 can be an indicator 114, which can be used to determine the level of liquid in the tank by direct visualization. The indicator 114 can be connected to a stem 116 that passes through the tank wall 120 into the tank, the stem's 116 other end being attached to a buoyant float (not shown) that rises and falls based upon the liquid present in the tank. The conventional tank gauge 100 can be mounted to the tank wall 120 using a threaded bushing 118, such that the conventional tank gauge 100 can be removed from the tank by unscrewing the conventional tank gauge 100 from the threaded bushing 118.

Figure 2:
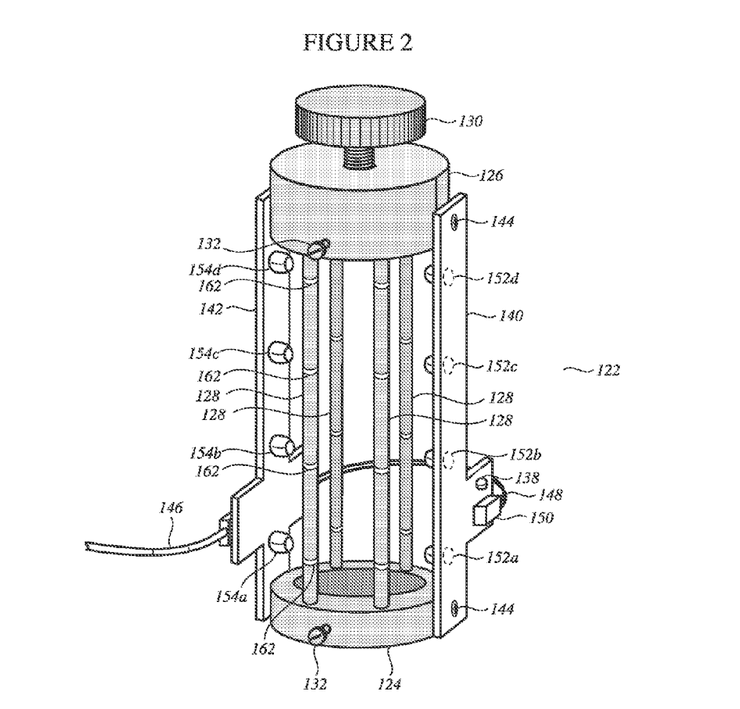
FIG. 2 is a perspective view of an optical sensor, according to an embodiment.

FIG. 2 is a perspective view of an optical sensor 122, according to an embodiment. The optical sensor 122 can slide over the measurement vial (not shown), allowing the conventional tank gauge (not shown) to be read while simultaneously recording and transmitting the liquid level electronically. The optical sensor 122 can be secured to the conventional tank gauge using an optical sensor frame that has a lower mounting ring 124 and an upper mounting cap 126, which are connected to one another using a plurality of vertical risers 128. Each vertical riser 128 may have one or more marks 162 applied directly on, or below, a portion of the surface, for the primary purpose of visually identifying the line of sight between an emitter and detector. The marks 162 can be created by using compatible paint or adhesive labels. Alternatively, the marks 162 can be created by etching or uniquely shaping the riser 128 material. The lower mounting ring 124 can have one or more holes configured to accept one or more set screws 132, which can be used to secure the optical sensor 122 to the conventional tank gauge. The lower mounting ring 124 can be tubular, and can have one or more flat faces that can allow the mounting of either the emitter circuit board 140 or the detector circuit board 142 by a board screw 144 such that the circuit boards 140, 142 are flush with the lower mounting ring 124.

The upper mounting cap 126 can have one or more holes configured to accept one or more set screws 132, which can be used to secure the optical sensor 122 to the conventional tank gauge. The upper mounting cap 126 can be tubular, and can have one or more flat faces that can allow the mounting of either the emitter circuit board 140 or the detector circuit board 142 by a board screw 144 such that the circuit boards 140, 142 are flush with the upper mounting cap 126. The upper mounting cap can include a countersunk chamber and hole located in the center, which can be configured to accept a height adjustment screw 130.

The one or more set screws 132 can be used to adjust the horizontal alignment of the optical sensor 122 on the conventional tank gauge 100 by screwing them further in or unscrewing them further out. The set screws 132 can have large heads and jut out from the optical sensor 122 for hand tightening. Alternatively, the set screws 132 can have standard screw heads and recess into a mounting ring or cap.

The height adjustment screw 130 can be used to adjust the vertical alignment of the optical sensor 122 on the conventional tank gauge 100 by screwing in or out. The end of the height adjustment screw 130 can be flat, and can include a plate that touches the measurement vial (not shown) so as to prevent the measurement vial from breaking during an over-adjustment. In an embodiment, protective foam (not shown) can be adhered to the end of the height adjustment screw 130 or the optional plate to provide further protection. The other end of the height adjusted screw 130 can be a wide textured head configured to be adjusted by hand. The lower mounting ring 124, upper mounting cap 126, vertical risers 128, height adjustment screw 130, and set screws 132 can be made of metal, plastic, elastomer, or a combination thereof.

The emitter circuit board 140 can have a plurality of photoemitters 152 attached to one side. The photoemitters 152 can generate photons at a pre-determined wavelength in the presence of a small electrical current. Each of the plurality of photoemitters 152 can require an emitter shroud (not shown) to create a narrow aperture for the photon beam, in order to provide a more accurate measurement. The emitter shroud can be created using heat shrink material, compatible paint, adhesive tape, or a prefabricated emitter housing. The emitter circuit board 140 can additionally have a wire harness 148 that can be used to hold the power and data cable bundle 146 used to provide power and data connection to the emitter circuit board 140. The power and data cable bundle 146 can be attached to the wire harness 148 using a plug and a socket design at the harness header 150 such that the power and data cable bundle 146 can be manually detached if necessary. Alternately, the power and data cable bundle 146 can be hard-wired to the emitter circuit board 140.

The emitter circuit board 140 can have a visual status indicator 138, which can be a single-color LED, configured to display the system states of the optical sensor. For example, the visual status indicator can illuminate when power is applied to the emitter board 140 and no system errors are detected; blink in a unique pattern when sending/receiving data; and blink in a second unique pattern if a predetermined error occurs. Alternatively, the visual status indicator 138 can be a multi-color LED, which can illuminate in two or different colors depending on the system state. For example, green when power is applied to the optical sensor and no system errors are detected; amber for sending and receiving data; and one or more unique red patterns for predetermined error codes. In each of the later cases the LED may be continuously on or blink to make further distinctions.

The detector circuit board 142 can have a plurality of photodetectors 154 attached to one side. The photodetectors 154 can be phototransistors that generate a small electrical current in the presence of photons at a pre-determined wavelength. The position of the photodetectors 154 can correspond to the position of the photoemitters 152 on the emitter circuit board 140. Each of the plurality of photodetectors 154 can require a detector shroud (not shown) to create a narrow aperture for the photon beam, in order to provide a more accurate measurement free from extraneous signals. The detector shroud can be created using heat shrink material, compatible paint, adhesive tape, or a prefabricated detector housing.

Figure 3:
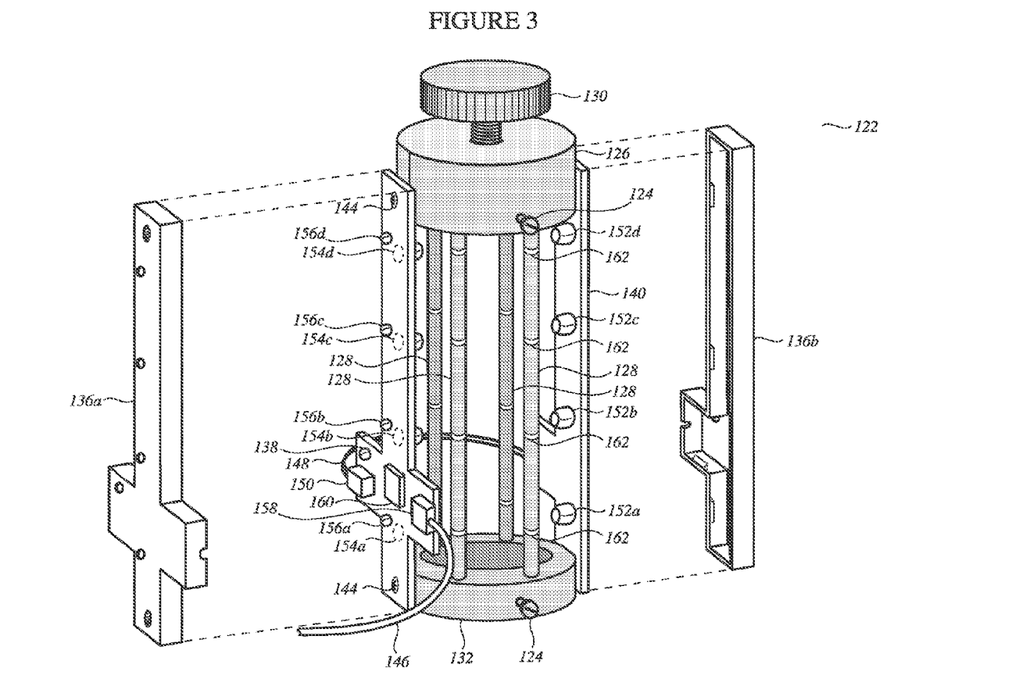
FIG. 3 is an exploded view of an optical sensor with molded enclosures, according to an embodiment.

FIG. 3 is an exploded view of an optical sensor with molded enclosures, according to an embodiment. The detector circuit board 142 can have a wire harness 148 that can be used to hold the power and data cable bundle 146 used to provide power and data connection to the detector circuit board 142. The power and data cable bundle 146 can be attached to the wire harness 148 using a plug and a socket design at the harness header 150 such that the power and data cable bundle 146 can be manually detached if necessary. Alternately, the power and data cable bundle 146 can be hard-wired to the detector circuit board 142. The detector circuit board 142 can have a wire port 158 that can interface with the main input/output cable 146 using a plug and socket design. A microcontroller 160 can read the analog output from each photodetectors 154 and convert the signal to a digital output using an analog to digital converter. The microcontroller 160 can produce a tank liquid level measurement based upon the digital output. The microcontroller 160 can also communicate the digital output, either directly or through a secondary device functioning as web client (not shown), to a web server (not shown) for transmission. The microcontroller 160 can also be configured to implement any other feature described herein. Either a microcontroller 160 can be used (which itself can function as a computer), or a microprocessor with the necessary components (ROM, RAM, input/output peripherals, etc.) can be used.

In one alternative embodiment of the invention a separate microcontroller 160 is integrated directly into the optical sensor 122 to handle signal processing from each photodetector 154 prior to transferring compiled data to the supporting hardware that functions predominately as a web client. This compartmentalization approach allows a single web client design to interface with many variations of the proposed invention without requiring significant changes.

Additionally, each photodetector 154 can have a corresponding detector indicator 156, which can be an LED, which can illuminate when the photodetector 154 ceases to detect the photon beam emitted from the corresponding photoemitter 152. Conversely, the detector indicator 156 can extinguish when the corresponding photodetector 154 detects the photon beam emitted from the corresponding photoemitter 152.

Molded enclosures 136 can be used to protect the one or both sides of an emitter circuit board 140 and the detector circuit board 142. The molded enclosures 136 can be made of plastic and can be held in place by snaps or screws that fasten to the optical sensor framework. The molded enclosures 136 can have one or more indicator holes to allow the detector indicators 154 or visual status indicator 138 to remain visible.

The detector circuit board 142 can have a visual status indicator 138, which can be a single-color LED, configured to display the system states of the optical sensor. For example, the visual status indicator can illuminate when power is applied to the detector board 142 and no system errors are detected; blink in a unique pattern when sending/receiving data; and blink in a second unique pattern if a predetermined error occurs. Alternatively, the visual status indicator 138 can be a multi-color LED, which can illuminate in two or different colors depending on the system state. For example, green when power is applied to the optical sensor and no system errors are detected; amber for sending and receiving data; and one or more unique red patterns for predetermined error codes. In each of the later cases the LED may be continuously on or blink to make further distinctions.

Figure 4A:
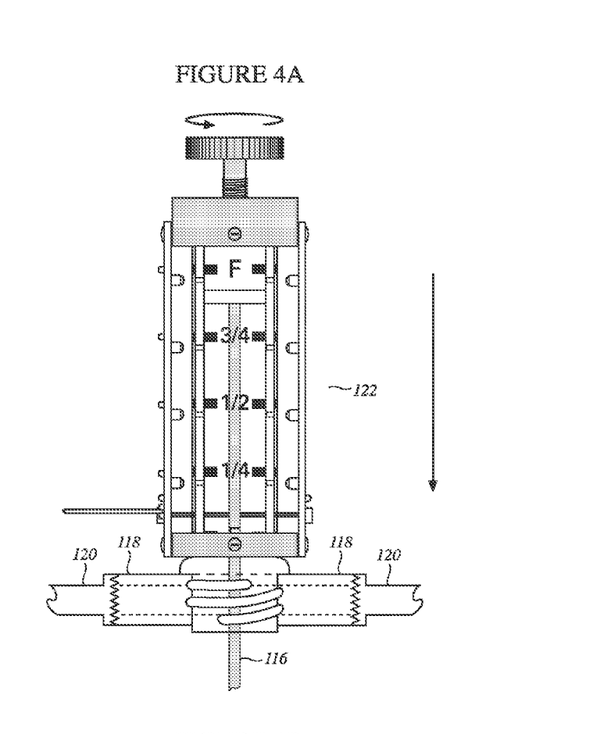
FIG. 4A is a cross section view of a conventional tank gauge with an optical sensor in the process of adjustment, according to an embodiment.

FIG. 4A is a cross section view of a conventional tank gauge with an optical sensor in the process of adjustment, according to an embodiment. In this view, the optical sensor 122 is set on the conventional tank gauge 100, with the photoemitters 152 and photodetectors 154 aligned below the measurement markings 104, 106, 108, 110. To raise the vertical position of the optical sensor 122, the user can loosen the set screws 132 located on the lower mounting ring 124 and the upper mounting cap 126. The user can then rotate the height adjustment screw 130 such that the height adjustment screw 130 lowers into the upper mounting cap 124.

Figure 4B:
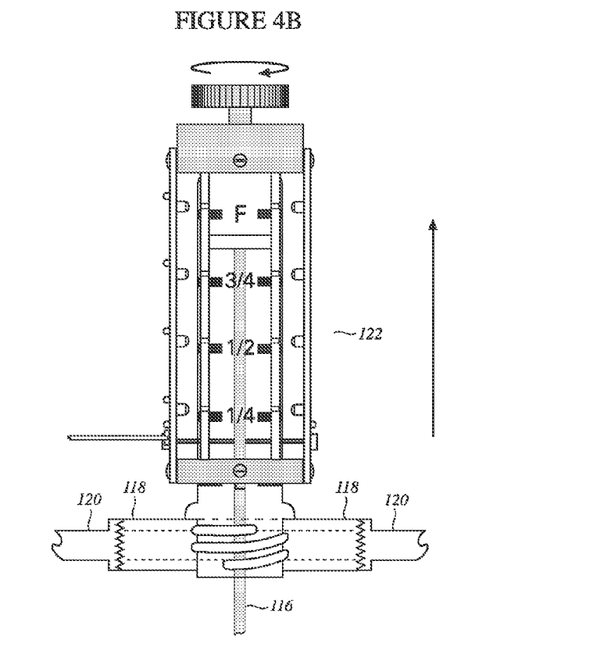
FIG. 4B is a cross section view of a conventional tank gauge with an optical sensor in the process of adjustment, according to an embodiment.

FIG. 4B is a cross section view of a conventional tank gauge with an optical sensor in the process of adjustment, according to an embodiment. In this view, the optical sensor 122 is set on the conventional tank gauge 100, with the photoemitters 152 and photodetectors 154 aligned above the measurement markings 104, 106, 108, 110.

Figure 5:
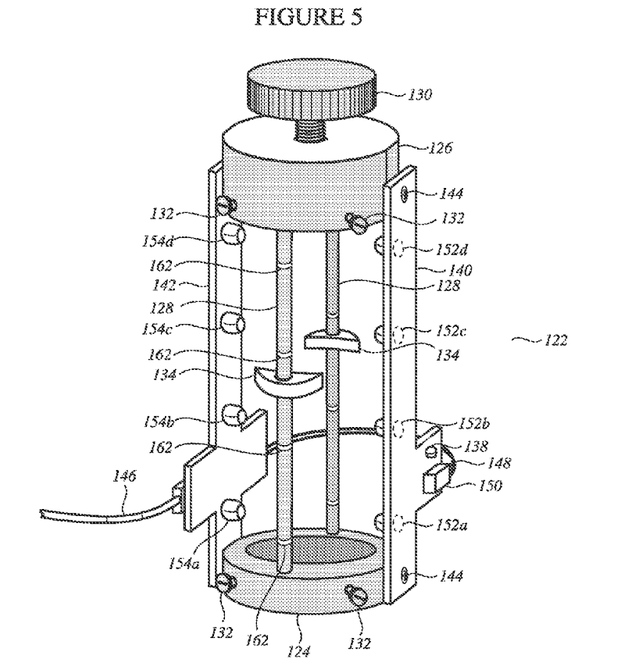
FIG. 5 is a perspective view of an optical sensor, according to an alternate embodiment.

FIG. 5 is a perspective view of an optical sensor 122, according to an alternate embodiment. One or more sliders 134 can be used to maintain parallel alignment between the conventional tank gauge 100 and the optical sensor 122. The sliders 134 can be mounted to the vertical risers 128 either by an embedded hole or a snap fastening. The sliders 134 can conform to the shape of the measurement vial 102. Alternatively, the sliders 134 can be circular or some other geometric shape. The sliders 134 can be raised or lowered along the vertical risers 128 in order to most effectively maintain parallel alignment between the measurement vial 102 and the optical sensor 122. A slider 134 can be made of metal, plastic, elastomer, or a combination thereof.

Figure 6:
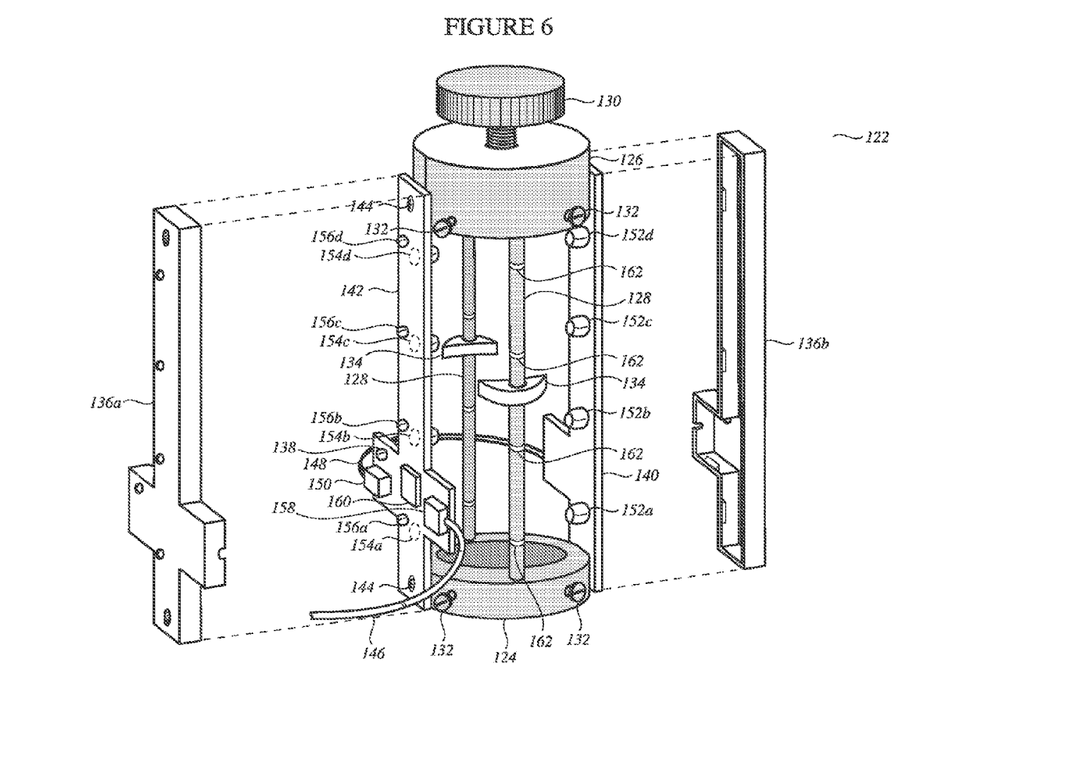
FIG. 6 is an exploded view of an optical sensor with molded enclosures, according to an alternate embodiment.

FIG. 6 is an exploded view of an optical sensor with molded enclosures, according to an alternate embodiment. The addition of the sliders 134 does not affect the placement of any other element in the alternate embodiment.

Figure 7:
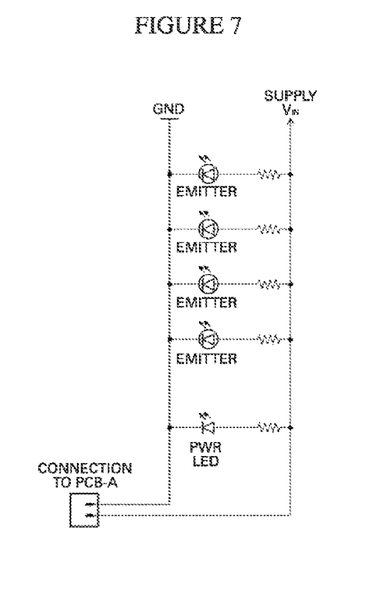
FIG. 7 is an example schematic diagram of a circuit implementing an optical sensor, according to an embodiment.

FIG. 7 is an example schematic diagram of a circuit implementing an optical sensor, according to an embodiment. The schematic diagram is one example of an implementation, however it can be appreciated that numerous other approaches can be taken as well.

Figure 8:
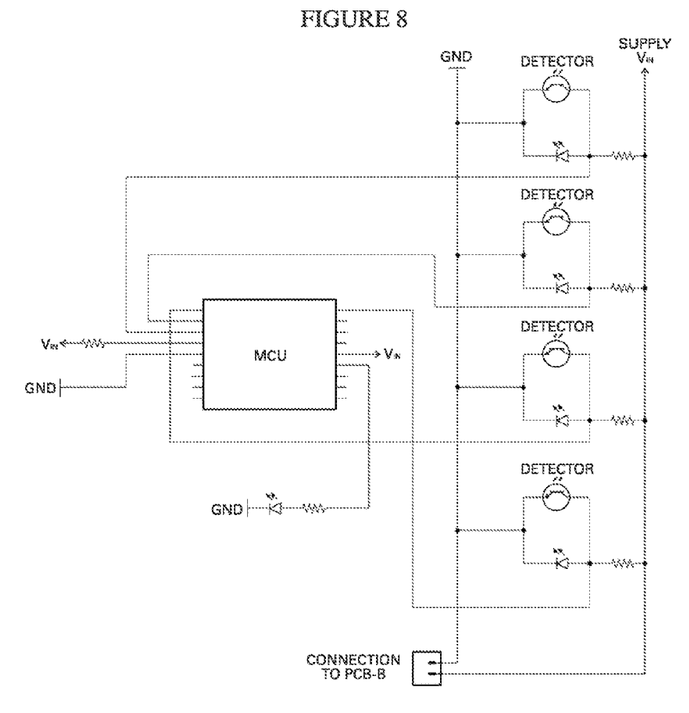
FIG. 8 is an example schematic diagram of a circuit implementing an optical sensor, according to an embodiment.

FIG. 8 is an example schematic diagram of a circuit implementing an optical sensor, according to an embodiment. The schematic diagram is one example of an implementation, however it can be appreciated that numerous other approaches can be taken as well.

Figure 9:
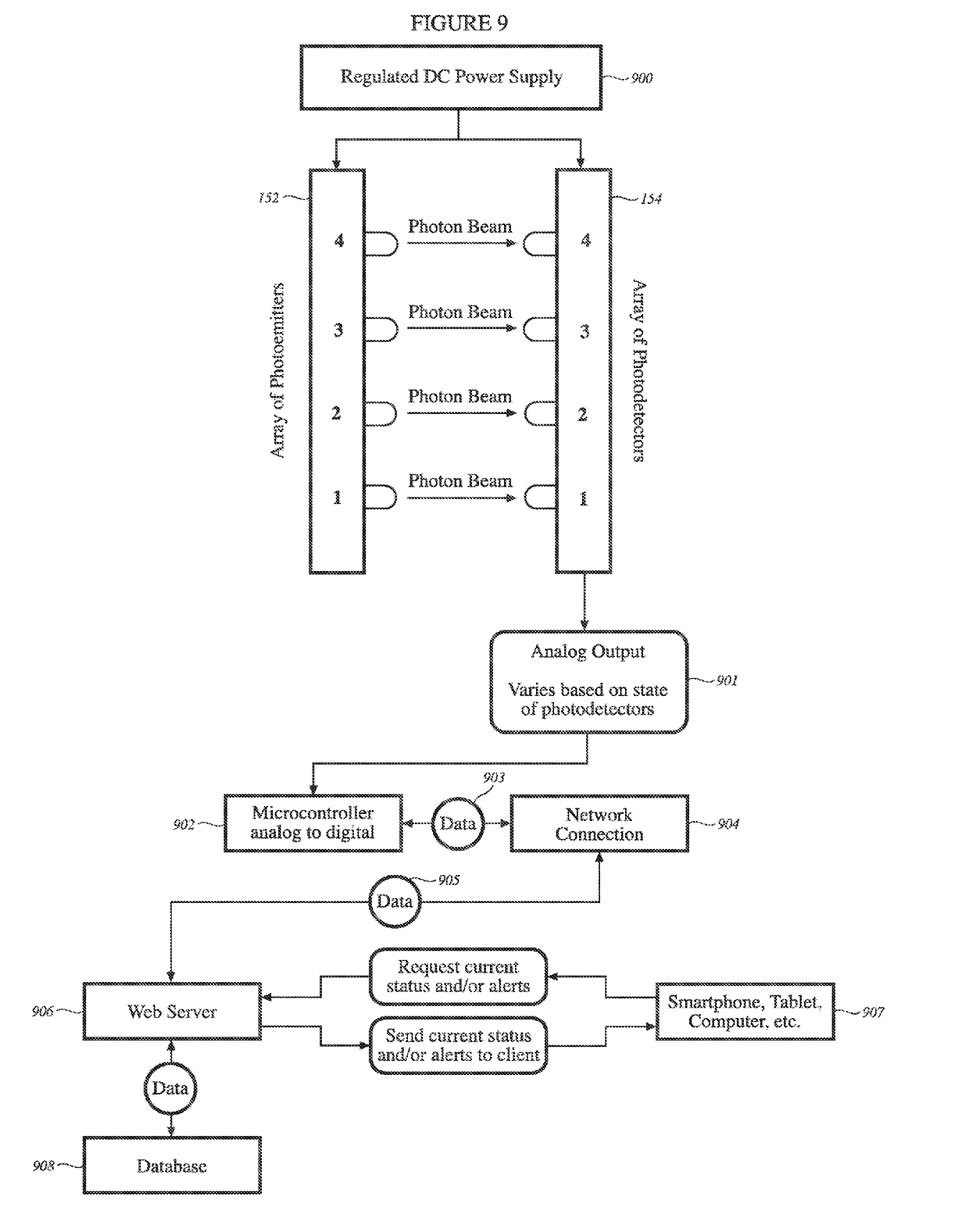
FIG. 9 is a block diagram illustrating the functions of an optical sensor, according to an embodiment.

FIG. 9 is a block diagram illustrating the functions of an optical sensor, according to an embodiment. The photoemitters 152 and photodetectors 154 can be powered by a regulated DC power supply 900. The photodetectors 154 can produce an analog data output 901, which is dependent on the state of the photodetectors 154. The analog data output 901 can be channeled into a digital output 903 by using an analog to digital converter 902, which can be integrated with the microcontroller 160. The microcontroller 160 can feed the digital output 903, either directly, or through a secondary device functioning as an embedded server on a local network or a web client, into a network connection 904, which can be wireless or wired, which can route to a web server 906. The network connection 904 can include a local area network. Once the digital output 903 is received by the web server 906 it can be analyzed and stored in a database 908. If the web server 906 determines particular data from a sensor meets certain criteria an automated message can be communicated to a user as a text message and/or an email message sent to a computerized device 907. The web server 906 can also host a secure web site to provide each unique user with access to various online services, such as but not limited to: 1) displaying graphics and text that represent the current status of the optical sensor 122; 2) turn automated messaging on/off; and 3) change the interval between client-server communications. Access to the web server 906 can be accomplished using nothing more than a web browser on numerous types of mobile or stationary devices 907 (e.g. computer, tablet, smartphone, etc.) with Internet access. Alternatively, access to the web server 906 can be accomplished using an application developed for various operating systems.

Figure 10:
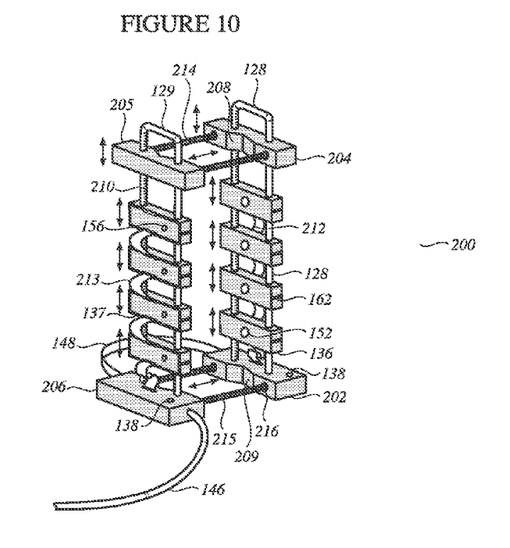
FIG. 10 is a perspective view of an optical sensor, according to an alternate embodiment.

FIG. 10 is a perspective view of an optical sensor, according to an alternate embodiment. The alternate embodiment of the optical sensor 200 utilizes the same emitter/detector principle as the primary embodiment, but can be placed in a frame that allows for placement on conventional tank gauges with varying sizes. The optical sensor 200 can have a plurality of emitter blocks 136, each block having a photoemitter 152. The emitter blocks 136 can be held in a vertical alignment by an emitter wire frame 128, which can run through each emitter block 136 to maintain position. Maintaining the vertical position of an emitter block 136 can be done using one or more set screws (not shown) that press against an emitter wire frame 128; and/or allowing an emitter block 136 to engage teeth 210 spaced along an emitter wire frame 128 that may or may not include location marks, such as numbers or colors, at various intervals. The emitter blocks 136 can be connected together with an emitter wire strip 212, which can be used to transmit data and power to the photoemitters 152 and the microcontroller (not shown). The emitter blocks 136 can be bounded by an emitter top piece 204 and an emitter base 202, which can also be connected to the emitter wire frame 128.

The emitter base 202 can have a visual status indicator 138, which can be a single-color LED, configured to display the system states of the optical sensor. For example, the visual status indicator can illuminate when power is applied to the emitter base 202 and no system errors are detected; blink in a unique pattern when sending/receiving data; and blink in a second unique pattern if a predetermined error occurs. Alternatively, the visual status indicator 138 can be a multi-color LED, which can illuminate in two or different colors depending on the system state. For example, green when power is applied to the optical sensor and no system errors are detected; amber for sending and receiving data; and one or more unique red patterns for predetermined error codes. In each of the later cases the LED may be continuously on or blink to make further distinctions.

The optical sensor 200 can have a plurality of detector blocks 137, each block having a photodetector (not shown). The detector blocks 137 can be held in a vertical alignment by a detector wire frame 129, which can run through each detector block 137 to maintain position. Maintaining the vertical position of a detector block 137 can be done using one or more set screws (not shown) that press against a detector wire frame 129; and/or allowing a detector block 137 to engage teeth 210 spaced along a detector wire frame 129 that may or may not include location marks, such as numbers or colors, at various intervals. The detector blocks 137 can be positioned such that a detector block 137 is aligned with an emitter block 136. The detector blocks 137 can be connected together with a detector wire strip 213, which can be used to transmit data and power to the photodetectors (not shown) and the microcontroller (not shown). The detector blocks 137 can be bounded by a detector top piece 205 and a detector base 206, which can also be connected to the detector wire frame 129. Each of the detector blocks 137 can have an indicator 156, which can be an LED, configured to illuminate when the photodetector ceases to detect the beam created from the corresponding photoemitter, and extinguish when the photodetector detects the beam created from the corresponding photoemitter.

The detector base 206 can have a visual status indicator 138, which can be a single-color LED, configured to display the system states of the optical sensor. For example, the visual status indicator can illuminate when power is applied to the detector base 206 and no system errors are detected; blink in a unique pattern when sending/receiving data; and blink in a second unique pattern if a predetermined error occurs. Alternatively, the visual status indicator 138 can be a multi-color LED, which can illuminate in two or different colors depending on the system state. For example, green when power is applied to the optical sensor and no system errors are detected; amber for sending and receiving data; and one or more unique red patterns for predetermined error codes. In each of the later cases the LED may be continuously on or blink to make further distinctions.

The emitter top piece 204 and the detector top piece 205 can be connected by one or more top springs 214, such that a cylindrical object can be inserted in between the emitter top piece 204 and the detector top piece 205, and be held in position through the top springs 214. Each end of a top spring 214 can be attached to opposing points 216 on an emitter top piece 204 and detector top piece 205 using a connection method that is permanent or detachable. The top spring 214 can be made of metal, plastic, natural or synthetic fibers, or a combination thereof. Alternatively, the emitter top piece 204 and the detector top piece 205 can be connected by one or more top springs 214 that have rigid or semi-rigid properties. Both the emitter top piece 204 and the detector top piece 205 can have top piece notches 208 to further conform to the conventional tank gauge. The top piece notches 208 can be comprised of one or more materials with properties that limit or restrict movement of an emitter top piece 204 and detector top piece 205 when pressed against a vial 102. The emitter base 202 and the detector base 206 can be connected by one or more base springs 215, such that a cylindrical object can be inserted in between the emitter base 202 and the detector base 206, and be held in position through the base springs 215. Each end of a base spring 215 can be attached to opposing points 216 on an emitter base piece 202 and detector base piece 206 using a connection method that is permanent or detachable. The base spring 215 can be made of metal, plastic, natural or synthetic fibers, or a combination thereof. Alternatively, the emitter base 202 and the detector base 206 can be connected by one or more base springs 215 that have rigid or semi-rigid properties. Both the emitter base 202 and the detector base 206 can have base notches 209 to further conform to the conventional tank gauge. The base notches 209 can be comprised of one or more materials with properties that limit or restrict movement of an emitter base 202 and detector base 206 when pressed against a vial 102. A data cable 146 can attach to either the detector base 206 or the emitter base 202, and can be used to transmit power and data to and from the optical sensor 200. A connection cable 148 can attach to the detector base 206 and the emitter base 202, and can be used to transmit power and data between the emitter blocks 136 and the detector blocks 137.

Figure 11:
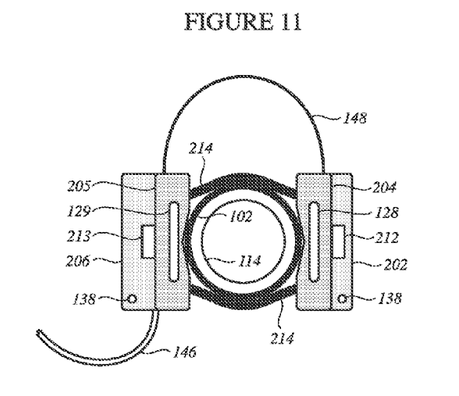
FIG. 11 is a top view of an optical sensor attached to a small conventional tank gauge, according to an alternate embodiment.

FIG. 11 is a top view of an optical sensor attached to a small conventional tank gauge, according to an alternate embodiment. In a small conventional tank gauge, the diameter of the measurement vial 102 is slightly larger than the diameter of the indicator 114. Due to the smaller size, the top springs 214 deform only slightly to admit the measurement vial 102 in between the detector top piece 205 and the emitter top piece 204. The connection cable 148, being flexible, can curve more dramatically to accommodate the smaller separation between the emitters and the detectors.

Figure 12:
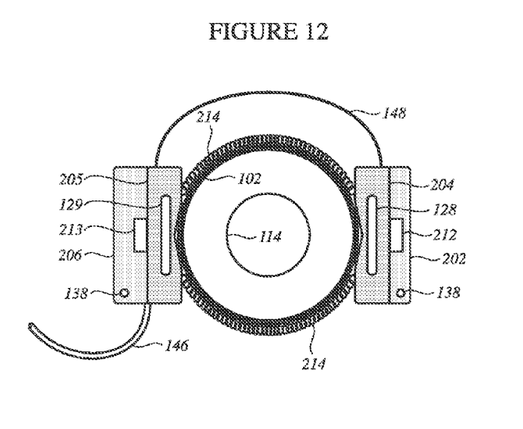
FIG. 12 is a top view of an optical sensor attached to a large conventional tank gauge, according to an alternate embodiment.

FIG. 12 is a top view of an optical sensor attached to a large conventional tank gauge, according to an alternate embodiment. In a large conventional tank gauge, the diameter of the measurement vial 102 is significantly larger than the diameter of the indicator 114. Due to the larger size, the top springs 214 deform significantly to admit the measurement vial 102 in between the detector top piece 205 and the emitter top piece 204. The connection cable 148, being flexible, straightens to accommodate the larger separation between the emitters and the detectors.

Although the present device has been described in terms of exemplary embodiments, none is limited thereto. Rather, the appended claims should be construed broadly to include other variants and embodiments of the present apparatus, which may be made by those skilled in the art without departing from the scope and range of equivalents of either the apparatus or the methods for using such an apparatus.

The invention claimed is:

1. An optical sensor for a conventional tank gauge, comprising:
    a plurality of emitter blocks, each comprising an photoemitter configured to emit a photon beam at a predetermined wavelength;
    a plurality of detector blocks, each comprising a photodetector, wherein each photodetector is configured to produce an analog output when the photon beam is detected by the photodetector;
    an optical sensor frame, comprising
    an emitter wire frame,
    a detector wire frame,
    one or more top springs;
    one or more base springs;
    a detector base and a detector top piece; and an emitter base and
    an emitter top piece,
    wherein the plurality of emitter blocks are connected in between the emitter top piece and the emitter base by the emitter wire frame;
    the plurality of the detector blocks are connected in between the detector top piece and the detector base by the detector wire frame;
    the detector top piece and the emitter top piece are connected by the top springs; and
    the detector base and the emitter base are connected by the base springs;
    an analog to digital converter configured to convert the analog output to a digital output; and
    one or more microcontrollers, configured to receive the digital output from the analog to digital converter and produce a tank liquid level measurement based upon the digital output,
    wherein the emitter blocks and the detector blocks are connected on opposite sides of the optical sensor frame such that the photoemitters are aligned with the photodetectors.

2. The optical sensor as recited in claim 1, the detector top piece and the emitter top piece further comprising a top piece notch.

3. The optical sensor as recited in claim 1, the detector base and the emitter base further comprising a base notch.

4. The optical sensor as recited in claim 1, wherein each of the photodetectors has a respective detector indicator which is configured to illuminate when the photodetector ceases to detect the photon beam from a respective aligned photoemitter and configured to extinguish when the photodetector detects the photon beam from the respective aligned photoemitter.

5. The optical sensor as recited in claim 1, further comprising a web server, wherein the one or more microcontrollers are configured to route the digital output to the web server through a network connection.

6. The optical sensor as recited in claim 5, wherein the web server is configured to communicate the digital output to a stationary or mobile device.

7. The optical sensor as recited in claim 5, wherein the web server is configured to communicate the digital output to a database.

8. The optical sensor as recited in claim 1, the emitter base further comprising a visual status indicator configured to display a system state.

9. The optical sensor as recited in claim 1, the detector base further comprising a visual status indicator configured to display a system state.

10. An apparatus, comprising:
    a plurality of photoemitters each configured to emit a photon beam at a pre-determined wavelength;
    a plurality of photodetectors, each aligned with a respective one of the plurality of photoemitters, each of the plurality of photodetectors configured to produce an analog output when the photon beam from a respective aligned photoemitter is detected;
    a microcontroller configured to receive the analog output from the plurality of photodetectors and from the analog output from the plurality of photodetectors produce a digital output, and transmit the digital output;
    an emitter circuit board comprising the plurality of photoemitters; and
    a detector circuit board comprising the plurality of photodetectors.

11. The apparatus as recited in claim 10, wherein each of the plurality of photodetectors has a respective detector indicator which is configured to illuminate when the photodetector ceases to detect the photon beam from the respective aligned photoemitter and configured to extinguish when the photodetector detects the photon beam from the respective aligned photoemitter.

12. The apparatus as recited in claim 11, further comprising
    a lower mounting ring;
    an upper mounting cap,
    the emitter circuit board having a first end of the emitter circuit board and a second end of the emitter circuit board opposite the first end; and
    the detector circuit board having a first end of the detector circuit board and a second end of the detector circuit board opposite the first end;
    wherein the first end of the emitter circuit board is connected to the lower mounting ring, the second end of the emitter circuit board is connected to the upper mounting cap,
    wherein the first end of the detector circuit board is connected to the lower mounting ring and the second end of the detector circuit board is connected to the upper mounting cap.

13. The apparatus as recited in claim 12, further comprising a plurality of vertical risers connected between the lower mounting ring and the upper mounting cap.

14. The apparatus as recited in claim 11, wherein the detector circuit board further comprises a visual status indicator configured to display a system state.

15. The apparatus as recited in claim 11, wherein the microcontroller is further configured to produce a tank liquid level measurement from the digital output.

16. An apparatus, comprising:
    a plurality of photoemitters each configured to emit a photon beam at a pre-determined wavelength;
    a plurality of photodetectors, each aligned with a respective one of the plurality of photoemitters, each of the plurality of photodetectors configured to produce an analog output when the photon beam from a respective aligned photoemitter is detected;
    a microcontroller configured to receive the analog output from the plurality of photodetectors and from the analog output from the plurality of photodetectors produce a digital output, and transmit the digital output;
    an emitter block comprising the plurality of photoemitters;
    a detector block comprising the plurality of photodetectors;
    a detector top piece connected to a top of the detector block;
    a detector base connected to a bottom of the detector block;
    an emitter top piece connected to a top of the emitter block; and
    an emitter base connected to a bottom of the emitter block.

17. The apparatus as recited in claim 16, further comprising:
    top springs connecting the detector top piece and the emitter top piece; and
    base springs connecting the detector base and the emitter base.

18. The apparatus as recited in claim 16, further comprising:
    an emitter wire frame connecting the emitter top piece and the emitter block and the emitter base; and
    a detector wire frame connecting the detector top piece and the detector block and the detector base.

19. The apparatus as recited in claim 16 wherein each of the plurality of photodetectors has a respective detector indicator which is configured to illuminate when the photodetector ceases to detect the photon beam from the respective aligned photoemitter and configured to extinguish when the photodetector detects the photon beam from the respective aligned photoemitter.

20. The apparatus as recited in claim 16 wherein the microcontroller is further configured to produce a tank liquid level measurement from the digital output.

* * * * *